(12) United States Patent
Kuroki

(10) Patent No.: US 12,110,949 B2
(45) Date of Patent: Oct. 8, 2024

(54) LINEAR MOTION APPARATUS AND ROBOT

(71) Applicant: FANUC CORPORATION, Yamanashi (JP)

(72) Inventor: Toshikatsu Kuroki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/255,892

(22) PCT Filed: Dec. 21, 2021

(86) PCT No.: PCT/JP2021/047151
§ 371 (c)(1),
(2) Date: Jun. 5, 2023

(87) PCT Pub. No.: WO2022/138595
PCT Pub. Date: Jun. 30, 2022

(65) Prior Publication Data
US 2024/0044398 A1 Feb. 8, 2024

(30) Foreign Application Priority Data
Dec. 24, 2020 (JP) .................. 2020-214527

(51) Int. Cl.
| *F16H 25/24* | (2006.01) |
| *B25J 9/12* | (2006.01) |
| *F16H 25/20* | (2006.01) |
| *F16H 25/22* | (2006.01) |

(52) U.S. Cl.
CPC .............. *F16H 25/24* (2013.01); *B25J 9/123* (2013.01); *F16H 25/2015* (2013.01); *F16H 25/2204* (2013.01); *F16H 2025/249* (2013.01)

(58) Field of Classification Search
CPC .. F16H 25/24; F16H 25/2015; F16H 25/2204; F16H 2025/249; B25J 9/123; B25J 9/044; B25J 19/0075
See application file for complete search history.

(56) References Cited

U.S. PATENT DOCUMENTS

2020/0338762 A1* 10/2020 Watanabe ................ B25J 9/101

FOREIGN PATENT DOCUMENTS

| JP | 3694261 B2 | 9/2005 |
| JP | 2008002531 A | 1/2008 |
| JP | 2012228733 A | 11/2012 |
| JP | 6087650 B2 | 3/2017 |

* cited by examiner

*Primary Examiner* — Terence Boes
(74) *Attorney, Agent, or Firm* — Renner, Otto, Boisselle & Sklar, LLP

(57) ABSTRACT

A linear motion apparatus has a linear motion mechanism having a long shaft member and a connecting member attached to the shaft member, wherein at least one of the shaft member and the connecting member moves in a longitudinal direction of the shaft member; and an antirust member attached to the linear motion mechanism, wherein the antirust member contains an antirust material having a higher ionization tendency than a material for the linear motion mechanism and is electrically connected to the linear motion mechanism.

8 Claims, 2 Drawing Sheets

LINEAR MOTION APPARATUS AND ROBOT

This application is a national phase of International Application No. PCT/JP2021/047151, filed Dec. 21, 2021, which claims priority to Japan Application No. 2020-214527, filed Dec. 24, 2020, each of which is hereby incorporated herein by reference.

TECHNICAL FIELD

The present invention relates to a linear motion apparatus and a robot.

BACKGROUND ART

Conventionally, a screw shaft of a ball screw has been used as a lifting shaft of a horizontal articulated robot (for example, see PTL 1).

CITATION LIST

Patent Literature

{PTL 1}
Japanese Unexamined Patent Application, Publication No. 2012-228733

SUMMARY OF INVENTION

Solution to Problem

According to an aspect of the present disclosure, there is provided a linear motion apparatus including: a linear motion mechanism having a long shaft member and a connecting member attached to the shaft member, wherein at least one of the shaft member and the connecting member moves in a longitudinal direction of the shaft member; and an antirust member attached to the linear motion mechanism. The antirust member contains an antirust material having a higher ionization tendency than a material for the linear motion mechanism and is electrically connected to the linear motion mechanism.

DESCRIPTION OF EMBODIMENTS

A linear motion apparatus and a robot according to one embodiment will now be described with reference to the drawings.

Figure 1:
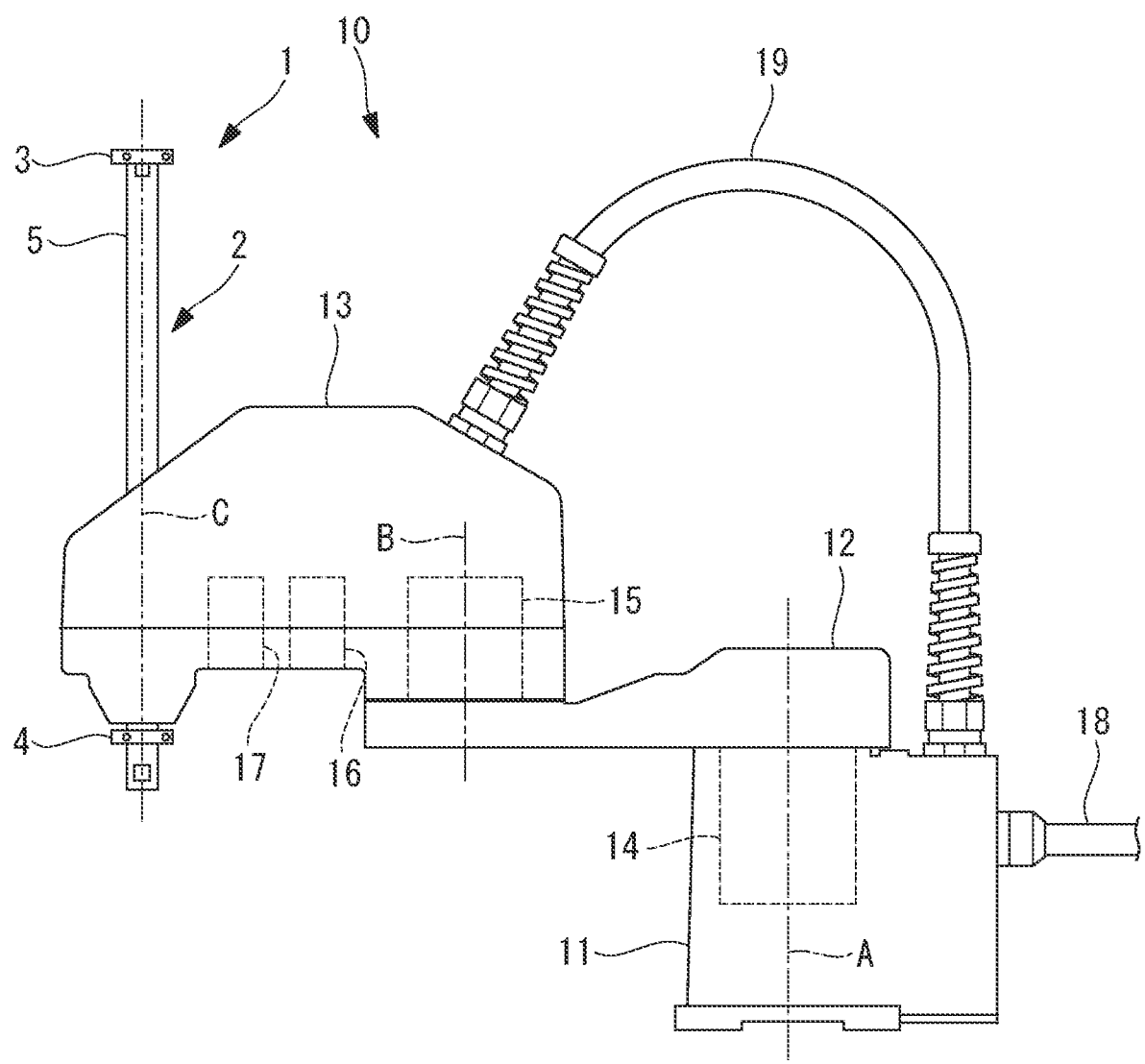
FIG. 1 illustrates the appearance of a robot according to one embodiment.

As illustrated in FIG. 1, a robot 10 is a horizontal articulated robot including a ball screw apparatus 1 that serves as a linear motion apparatus and that has a screw shaft 5 functioning as a lifting shaft. The robot 10 includes a base 11 to be installed on an installation surface, a first arm 12 supported by the base 11, a second arm 13 supported by the first arm 12, and the ball screw apparatus 1 attached to the second arm 13. Reference signs 18 and 19 each denote a cable or a conduit for supplying control signals and power to servo motors 14, 15, 16, and 17 in the robot 10.

One end portion of the first arm 12 is supported by the base 11 so as to be rotatable about a first axis A in the vertical direction. The first arm 12 is rotated by the servo motor 14 in the base 11 relative to the base 11.

One end portion of the second arm 13 is supported by another end portion of the first arm 12 so as to be rotatable about a second axis B in the vertical direction. The second arm 13 is rotated by the servo motor 15 in the second arm 13 relative to the first arm 12.

The screw shaft 5 of the ball screw apparatus 1 penetrates through another end portion of the second arm 13 in the vertical direction, and is supported by the second arm 13 so as to be linearly movable along a third axis C in the vertical direction and rotatable about the third axis C. The third axis C is coincident with the longitudinal axis of the screw shaft 5.

The ball screw apparatus 1 includes a ball screw 2 that serves as a linear motion mechanism, and antirust members 3 and 4 attached to the ball screw 2.

Figure 2:
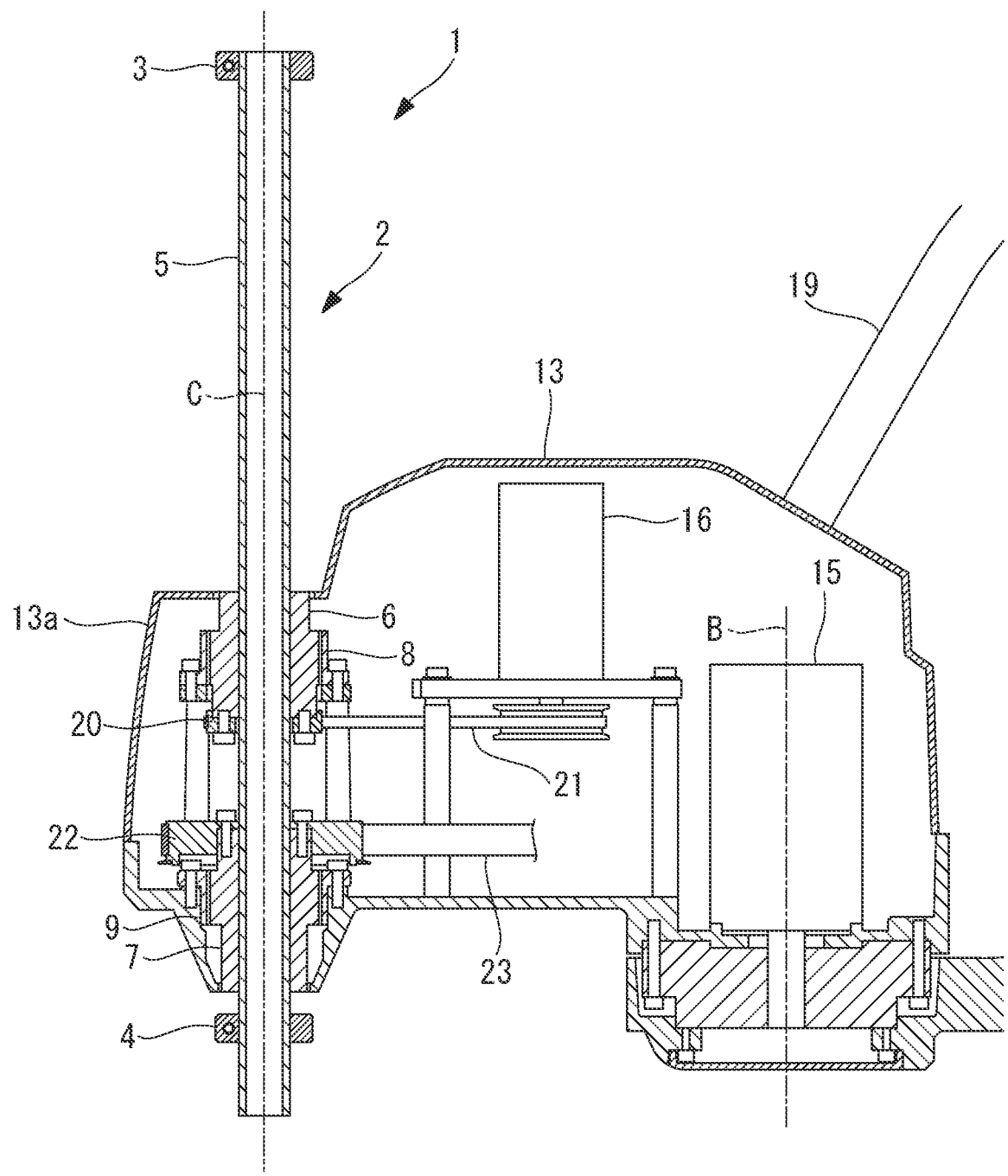
FIG. 2 is a partial vertical sectional view of an inner structure of the robot illustrated in FIG. 1.

As illustrated in FIG. 2, the ball screw 2 includes a long screw shaft (shaft member) 5, a ball screw nut (connecting member) 6 and a ball spline nut (connecting member 7) that are attached to the screw shaft 5 and support the screw shaft 5, and bearings 8 and 9 that support the nuts 6 and 7. Each of the parts 5, 6, 7, 8, and 9 of the ball screw 2 is made of a high-rigidity metal or alloy, and an antirust agent is applied to the surfaces of the parts 5, 6, 7, 8, and 9.

Furthermore, the screw shaft 5 is a ball screw spline shaft, and a spiral screw groove (not illustrated) and a straight-line spline groove (not illustrated) extending in the longitudinal direction of the screw shaft 5 are formed on the outer peripheral surface of the screw shaft 5. Metal balls of the ball screw nut 6 fit into the spiral groove, and metal balls of the ball spline nut 7 fit into the spline groove. The ball screw nut 6 and the ball spline nut 7 are supported by the bearings 8 and 9 so as to be rotatable about the third axis C relative to the second arm 13.

The ball screw nut 6 is connected to the servo motor 16 via a pulley 20 and a belt 21. Rotation of the servo motor 16 is transmitted to the ball screw nut 6 via the belt 21 and the pulley 20 and rotates the ball screw nut 6 about the third axis C, and, as a result, the screw shaft 5 moves in the vertical direction along the third axis C.

The ball spline nut 7 is connected to the servo motor 17 via a pulley 22 and a belt 23. Rotation of the servo motor 17 is transmitted to the ball spline nut 7 via the belt 23 and the pulley 22 and rotates the ball spline nut 7 about the third axis C, and, as a result, the screw shaft 5 rotates about the third axis C. In FIG. 2, illustration of the servo motor 17 is omitted.

The ball screw 2 includes a stopper 3 fixed to an upper end portion of the screw shaft 5, and a stopper 4 fixed to a lower end portion of the screw shaft 5. The stoppers 3 and 4 are annular or cylindrical members fixed to the outer peripheral surface of the screw shaft 5. Two stoppers 3 and 4 mechanically limit the vertical movement of the screw shaft 5 relative to the second arm 13 to within a particular movable range. Specifically, the stopper 3 on the upper side abuts with an arm cover 13a of the second arm 13 or a member attached to the second arm 13 and thereby prevents the screw shaft 5 from going down further. The stopper 4 on the lower side abuts with the arm cover 13a or a member attached to the second arm 13 and thereby prevents the screw shaft 5 from going up further. In the example illustrated in FIG. 2, the stopper 3 abuts with the ball screw nut 6, and the stopper 4 abuts with the ball spline nut 7.

The antirust members are the stoppers 3 and 4. Each of the stoppers 3 and 4 is made of a high-rigidity metal or alloy, is in direct contact with the screw shaft 5, and is electrically connected to the parts 5, 6, 7, 8, and 9 of the ball screw 2. The stoppers 3 and 4 contain an antirust material that has a higher ionization tendency than the material for the ball screw 2. The antirust material is preferably a metal or alloy that has high strength as well as high ionization tendency. For example, the main material for the parts 5, 6, 7, and 8 of the ball screw 2 is iron, and the antirust material for the stoppers 3 and 4 is zinc or magnesium. The material for the stoppers 3 and 4 is selected according to the material for the ball screw 2.

In one example, each of the stoppers 3 and 4 are entirely made of an antirust material.

In another example, each of the stoppers 3 and 4 has a coating film made of an antirust material covering the surface of the stopper 3 or 4. The coating film is formed by surface-treating the stoppers 3 and 4. When the stoppers 3 and 4 have coating films made of an antirust material, the material for the bodies of the stoppers 3 and 4 may be any material, such as aluminum or iron, commonly used as a stopper material.

Next, the operations of the ball screw apparatus 1 and the robot 10 are described.

The robot 10 is sometimes put in an environment exposed to water or water vapor, such as an environment where a cleaning fluid splashes. In particular, the screw shaft 5 exposed outside the arm cover 13a is likely to be exposed to water or water vapor.

According to this embodiment, the stoppers 3 and 4 fixed to the end portions of the screw shaft 5 contain an antirust material that has a higher ionization tendency than the material for the ball screw 2, and are electrically connected to the ball screw 2. Therefore, the stoppers 3 and 4 act as sacrificial anodes for the ball screw 2, and become preferentially oxidized and rusted before the ball screw 2. As a result, rusting of the ball screw 2, in particular, the screw shaft 5, is prevented, and the effect of the antirust agent lasts long. Accordingly, the cycle of applying the antirust agent can be extended, and the effort needed to maintain the robot 10 can be reduced.

The screw shaft 5 is an exposed portion exposed outside the robot 10, and the stoppers 3 and 4 are attached to the exposed portion. In this manner, the stoppers 3 and 4 can effectively function as the sacrificial anodes of the screw shaft 5, and thus rusting of the screw shaft 5 can be effectively prevented.

Moreover, since the stoppers 3 and 4 are placed outside the arm cover 13a, maintenance, such as replacement, is easy compared to the parts 6, 7, 8, and 9 of the ball screw 2 placed inside the arm cover 13a. Thus, by using the stoppers 3 and 4 as the antirust members, the maintenance needed to retain the antirust effect can be facilitated.

In this embodiment, the stoppers 3 and 4 also function as the antirust members; alternatively, parts other than the stoppers 3 and 4 may function as antirust members.

In one modification, antirust members dedicated for antirust function different from the stoppers 3 and 4 may be attached to the ball screw 2. In order to obtain a higher antirust effect, the antirust members are preferably attached to the screw shaft 5 or the stoppers 3 and 4 that are exposed outside the robot 10.

In another modification, parts of the ball screw 2 other than the stoppers 3 and 4 may be antirust members. For example, an outer surface of one portion of the screw shaft 5 not penetrating through the ball screw nut (connecting member) 6 or the ball spline nut (connecting member) 7 may be covered with a coating film of an antirust material so that this portion of the screw shaft 5 functions as the antirust member.

In this embodiment, the screw shaft 5 is a ball screw spline shaft that has both a screw groove and a spline groove; alternatively, the screw shaft 5 may be a ball screw shaft that has a screw groove but not a spline groove. When the screw shaft 5 is a ball screw shaft, the ball spline nut 7 is not necessary.

In this embodiment, the robot 10 may include a linear motion mechanism other than the ball screw 2, and the shaft member of the linear motion mechanism may act as the lifting shaft. In such a case, the antirust members 3 and 4 may be attached to the lifting shaft. In addition, an actuator for moving the lifting shaft up and down may be connected to the connecting member. For example, the actuator may be the ball screw 2, the ball screw nut 6 may be fixed to the lifting shaft via the connecting member, and the ball screw nut 6 and the lifting shaft may together move up and down by the rotation of the screw shaft 5.

In this embodiment, the robot 10 is a horizontal articulated robot; alternatively, the robot 10 may be any other type of robot including a linear motion shaft, and a shaft member of a linear motion mechanism may be used as the linear motion shaft.

In this embodiment, the ball screw apparatus 1 is installed in the robot 10; alternatively, a ball screw apparatus 1 may be installed in any machine or device other than a robot. In particular, the ball screw apparatus 1 is suitable as a machine or device used in a wet environment, and the case where at least one portion of the ball screw 2 is exposed outside the machine or device is more suitable. For example, the ball screw apparatus 1 may be used as a moving mechanism for moving a table of a machine tool.

The specific structure of the ball screw apparatus 1 can be changed depending on the machine or device to which the ball screw apparatus 1 is applied. For example, the screw shaft 5 may be a ball screw shaft, and the bearings 8 and 9 may directly support the screw shaft 5, not the nuts 6 and 7.

In this embodiment, the linear motion apparatus is the ball screw apparatus 1; alternatively, the linear motion apparatus may be any linear motion apparatus including a linear motion mechanism other than the ball screw 2. For example, one of the shaft member and the connecting member may be connected to a motor, and the linear motion mechanism and the linear motion apparatus may be configured such that the shaft member and the connecting member move relative to each other in the longitudinal direction by power from the motor. Alternatively, the connecting member may be fixed to the shaft member and connected to a motor, and the linear motion mechanism and the linear motion mechanism may be configured such that the shaft member and the connecting member move together in the longitudinal direction by power from the motor.

REFERENCE SIGNS LIST 1 ball screw apparatus (linear motion apparatus)
2 ball screw (linear motion mechanism)
3, 4 stopper, antirust member
5 screw shaft (shaft member)
6 ball screw nut (connecting member)
7 ball spline nut (connecting member)
8, 9 bearing
10 robot (machine, device)

The invention claimed is:

1. A linear motion apparatus comprising:

a linear motion mechanism having a elongated shaft member and a connecting member attached to the shaft member, wherein at least one of the shaft member and the connecting member moves in a longitudinal direction of the shaft member; and an antirust member attached to an end portion of the shaft member, wherein the antirust member contains an antirust material having a higher ionization tendency than a material for the linear motion mechanism and is electrically connected to the linear motion mechanism.

2. The linear motion apparatus according to claim 1, wherein the linear motion mechanism is a ball screw that has a screw shaft as the shaft member and a ball screw nut as the connecting member, and the shaft member and the ball screw nut move relative to each other in the longitudinal direction.

3. The linear motion apparatus according to claim 1, wherein the antirust member is made of the antirust material.

4. The linear motion apparatus according to claim 1, wherein the antirust member has a coating film that covers a surface of the antirust member and is made of the antirust material.

5. The linear motion apparatus according to claim 1, wherein the antirust member is a stopper fixed to the end portion of the shaft member.

6. The linear motion apparatus according to claim 1, wherein at least one portion of the linear motion mechanism is an exposed portion exposed to outside of a machine or device onto which the linear motion mechanism is mounted, and the antirust member is attached to the exposed portion.

7. A robot comprising the linear motion apparatus according to claim 1.

8. The robot according to claim 7, wherein the robot is a horizontal articulated robot that includes the shaft member as a lifting shaft.

* * * * *